US012557923B2

(12) United States Patent
Uracs

(10) Patent No.: US 12,557,923 B2
(45) Date of Patent: Feb. 24, 2026

(54) FURNITURE AND TOY ASSEMBLY FOR CHILDREN

(71) Applicants: TREND-INOVEST MAGYARORSZÁG KFT., Budapest (HU); Róbert Uracs, Budapest (HU)

(72) Inventor: Róbert Uracs, Budapest (HU)

(73) Assignees: Róbert Uracs, Budapest (HU); TREND-INOVEST MAGYARORSZÁG KFT., Budapest (HU)

( * ) Notice: Subject to any disclaimer, the term of this patent is extended or adjusted under 35 U.S.C. 154(b) by 117 days.

(21) Appl. No.: 18/557,943

(22) PCT Filed: May 3, 2022

(86) PCT No.: PCT/HU2022/050041
§ 371 (c)(1),
(2) Date: Oct. 29, 2023

(87) PCT Pub. No.: WO2022/234307
PCT Pub. Date: Nov. 10, 2022

(65) Prior Publication Data
US 2024/0225303 A1     Jul. 11, 2024

(30) Foreign Application Priority Data

May 3, 2021    (HU) .................................. P2100180

(51) Int. Cl.
A47D 11/00        (2006.01)
A47D 15/00        (2006.01)
(Continued)

(52) U.S. Cl.
CPC ............ A47D 11/002 (2013.01); A47D 15/00 (2013.01); F16B 12/24 (2013.01); A63G 21/02 (2013.01)

(58) Field of Classification Search
CPC ...... A47B 85/04; A47D 11/002; A47D 15/00; F16B 12/24
(Continued)

(56) References Cited

U.S. PATENT DOCUMENTS 584,132  A  *  6/1897  Hunzinger ............. A47C 13/00
                                                      297/118
1,773,501  A  *  8/1930  Scholnhammer ...... A47B 85/04
                                                      297/122
(Continued)

FOREIGN PATENT DOCUMENTS

CA          1290558  C      10/1991
CN       204105483  U       1/2015
(Continued)

OTHER PUBLICATIONS

Victorian High Chair/Rocker published: May 18, 2017 (May 18, 2017), retrieved from the Internet: Nov. 16, 2023) (Nov. 16, 2023), Link: https://onthesquareemporium.com/product/victorian-high-chairrocker/.
(Continued)

*Primary Examiner* — Jose V Chen
(74) *Attorney, Agent, or Firm* — Sand, Sebolt & Wernow Co., LPA

(57)        ABSTRACT

A convertible furniture and toy assembly for children, which has a symmetrical base unit and replaceable module elements that can be attached thereto. The base unit contains two side units arranged at an equal distance from its plane of symmetry and at least two connecting elements connecting the two side units. The convertible furniture and toy assembly for children is provided with a stabilizing system in which the side unit of the base unit contains a first side element, a second side element, and an intermediate side element connecting them. The first side element is arranged at a predetermined distance X and the second side element
(Continued)

is arranged at a predetermined distance X+Y+V from the plane of symmetry. The stabilizing system preferably also contains at least one connecting member and module elements that can be installed symmetrically on the base unit.

20 Claims, 9 Drawing Sheets

(51) Int. Cl.
| | | |
|---|---|---|
| *F16B 12/24* | (2006.01) | |
| *A63G 21/02* | (2006.01) | |

(58) Field of Classification Search
USPC ........................ 297/118, 119; 108/12, 17, 19
See application file for complete search history.

(56) References Cited

U.S. PATENT DOCUMENTS

| | | | | |
|---|---|---|---|---|
| 2,470,011 A * | 5/1949 | Winter | A47B 85/06 | |
| | | | 248/158 | |
| 2,705,524 A * | 4/1955 | Shipman | A47B 3/14 | |
| | | | 297/271.5 | |
| 4,205,876 A * | 6/1980 | Cetina | A47D 1/103 | |
| | | | 297/118 | |
| 4,618,183 A * | 10/1986 | Bauer | A47C 13/00 | |
| | | | 297/3 | |
| 5,690,379 A * | 11/1997 | Cayssials | A47D 1/08 | |
| | | | 297/118 | |
| 5,806,922 A * | 9/1998 | Mendelovich | A47D 1/0081 | |
| | | | 297/130 | |
| 6,155,641 A * | 12/2000 | Frost | A47C 3/20 | |
| | | | 297/440.13 | |
| 6,601,864 B1 * | 8/2003 | Hoyt | A61G 5/10 | |
| | | | 280/304.5 | |
| 8,276,984 B1 * | 10/2012 | Jamison, Jr. | A47C 17/14 | |
| | | | 297/125 | |
| 8,720,989 B2 * | 5/2014 | Jurcic | A47C 13/00 | |
| | | | 297/118 | |
| 10,588,425 B1 * | 3/2020 | Jordan | B62B 7/008 | |
| 11,622,632 B2 * | 4/2023 | Tackaberry | A47D 1/002 | |
| | | | 297/134 | |
| 11,723,477 B2 * | 8/2023 | Rogers | A47D 1/103 | |
| | | | 297/118 | |
| 12,156,598 B1 * | 12/2024 | Geng | A47D 11/002 | |
| 2004/0032152 A1 * | 2/2004 | Tally | A47C 12/00 | |
| | | | 297/118 | |
| 2005/0099038 A1 * | 5/2005 | Hinds | A47C 15/004 | |
| | | | 280/30 | |
| 2008/0182477 A1 * | 7/2008 | Catelli | A47J 45/071 | |
| | | | 297/118 | |
| 2012/0080910 A1 * | 4/2012 | Davis | F16B 12/10 | |
| | | | 211/186 | |
| 2013/0020840 A1 * | 1/2013 | Berginc | A47C 1/14 | |
| | | | 297/118 | |
| 2014/0042780 A1 * | 2/2014 | Warncke | A47C 4/02 | |
| | | | 297/134 | |

FOREIGN PATENT DOCUMENTS

| | | | | | |
|---|---|---|---|---|---|
| CN | 110558777 A | * | 12/2019 | ............. | A47D 11/00 |
| DE | 2804848 A | | 8/1979 | | |
| DE | 202016002301 U1 | * | 4/2016 | ............... | A63B 9/00 |
| EM | 001233498-0001 | | 9/2010 | | |
| EM | 001765595-0001 | | 10/2010 | | |
| EM | 001765595-0002 | | 10/2010 | | |
| EM | 001765595-0003 | | 10/2010 | | |
| EM | 003113554-0001 | | 5/2016 | | |
| EP | 0036430 A1 | | 9/1981 | | |
| GB | 1256295 A | | 12/1971 | | |
| GB | 2494474 A | | 3/2013 | | |
| JP | 2014204946 A | | 10/2014 | | |
| WO | 2017007543 A1 | | 1/2017 | | |

OTHER PUBLICATIONS

INFANS 3 in 1 Baby High Chair, Convertible Toddler Table Chair Set published: Jul. 5, 2019 (Jul. 5, 2019), retrieved from the Internet: Nov. 16, 2023 (Nov. 16, 2023), Link: https://www.pricepulse.app/infans-5-in-1-baby-high-chair-convertible-toddler_us_4104617#google_vignette.

Loopwheels brochure published: Dec. 11, 2018 (Dec. 11, 2018), retrieved from the Internet: Nov. 16, 2023 (Nov. 16, 2023), Link: https://loopwheels.com/wp-content/uploads/2018/12/Loopwheels-Brochure.pdf.

International Search Report PCT Application No. PCT/HU2022/050041 published: Nov. 10, 2022 (Nov. 10, 2022), retrieved from the Internet Nov. 16, 2023 (Nov. 16, 2023).

Heavy Duty Turnlocks sold by Anemo Engineering: <URL: https://anemo.eu/turnlock-heavy-duty>. Retrieved from the Internet: Oct. 11, 2023.

IMAO Quarter-Turn Clamps sold by Anemo Engineering: <URL: https://anemo.eu/imao/quarter-turn-clamps>. Retrieved from the Internet: Oct. 11, 2023 (Oct. 11, 2023).

DZUS® Quarter-Turn Fasteners sold by Southco: <URL: https://southco.com/en_us_int/fasteners/emdzusemreg-quarter-turn-fasteners>. Retrieved from the Internet: Oct. 11, 2023 (Oct. 11, 2023).

International Search Report PCT Application No. PCT/HU2022/050042 published: Nov. 10, 2022 (Nov. 10, 2022), retrieved from the Internet: Nov. 16, 2023 (Nov. 16, 2023).

* cited by examiner

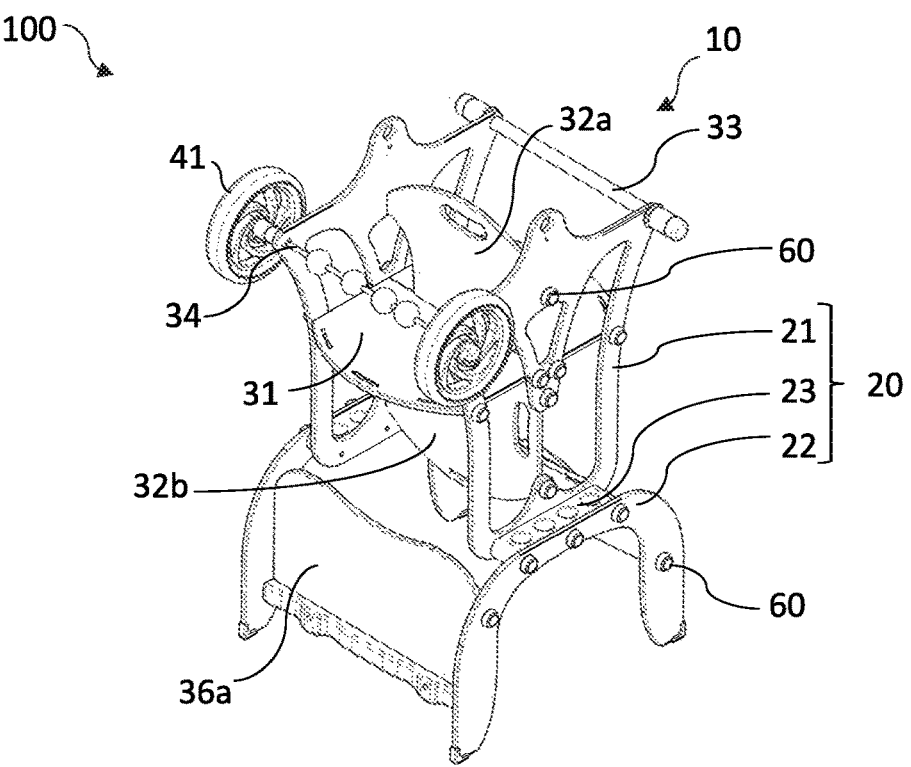
Figure 1.a
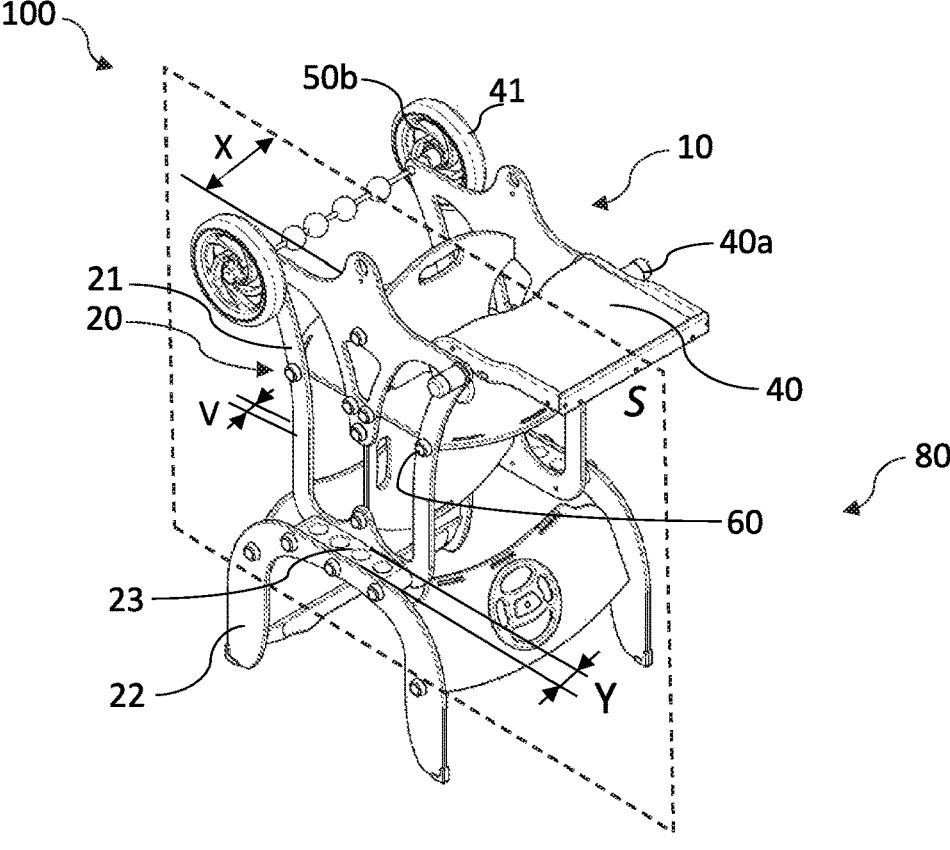
Figure 1.b

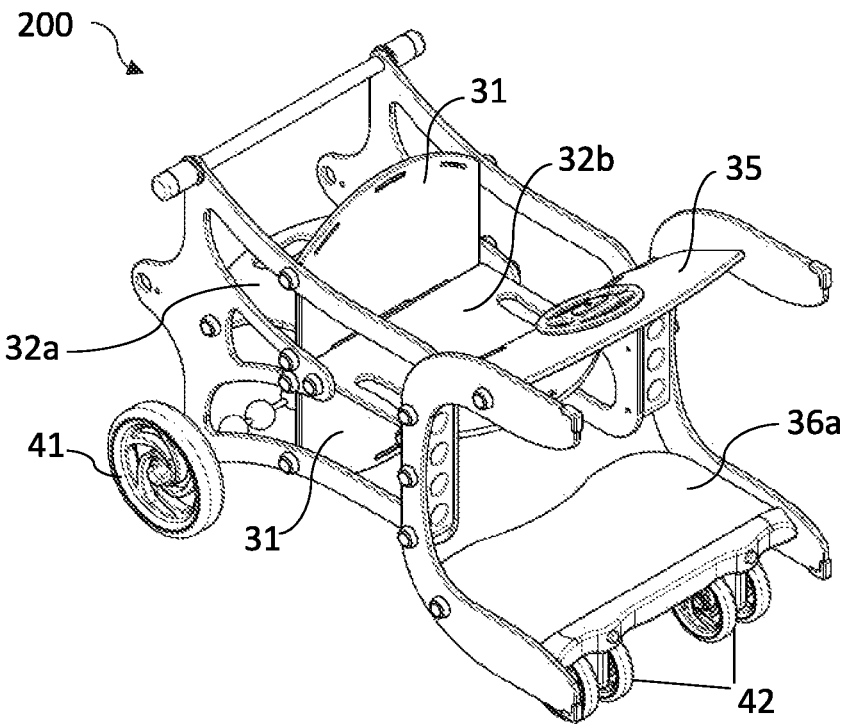
Figure 2.a
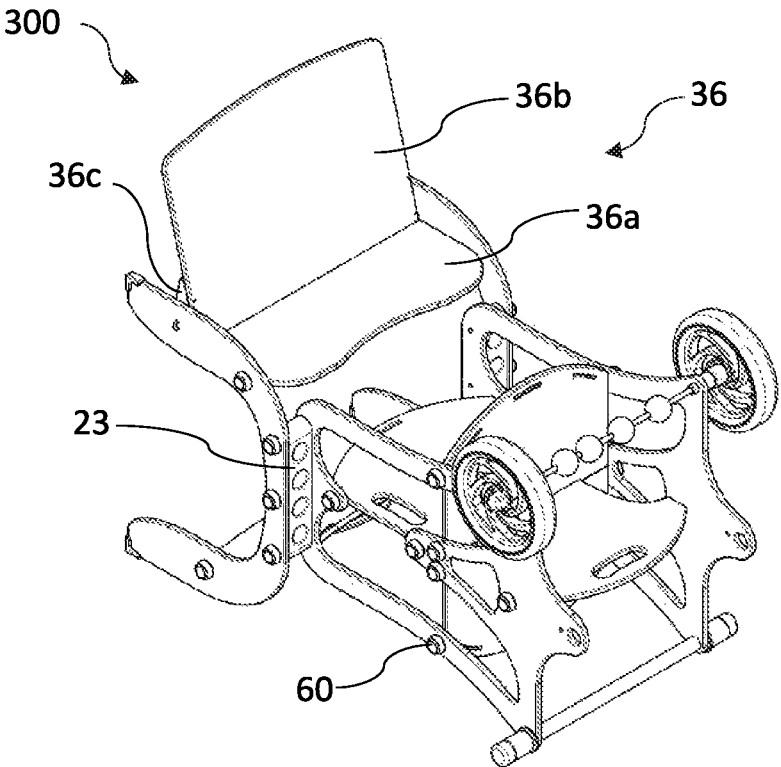
Figure 2.b

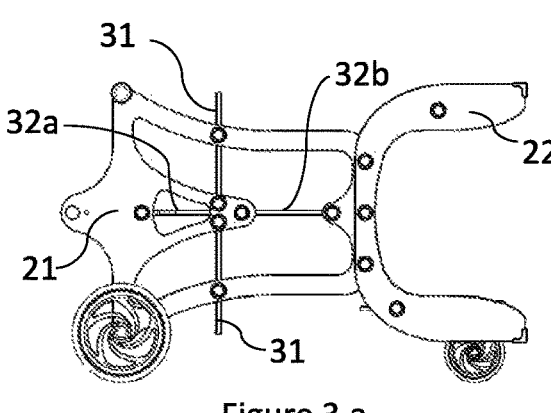
Figure 3.a
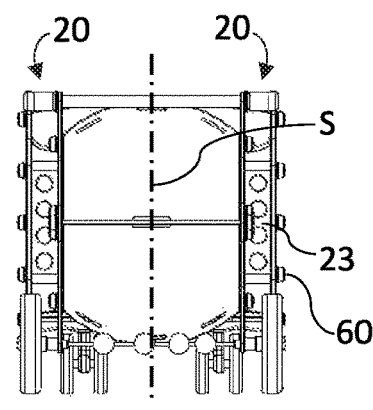
Figure 3.b
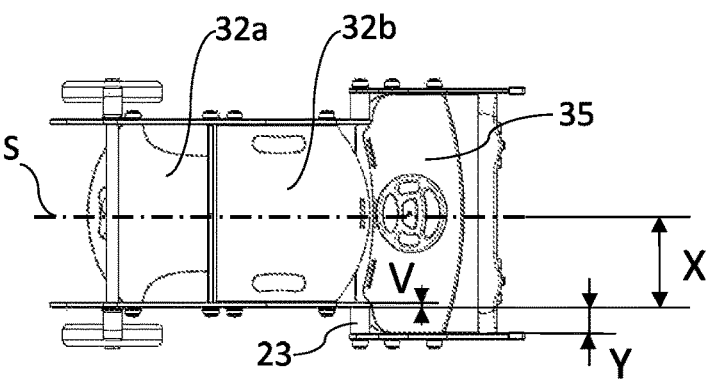
Figure 3.c
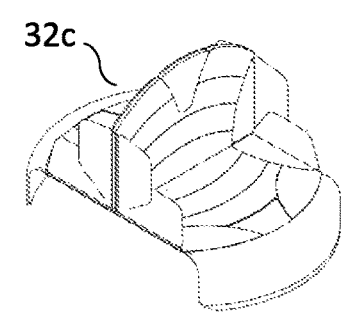
Figure 3.d
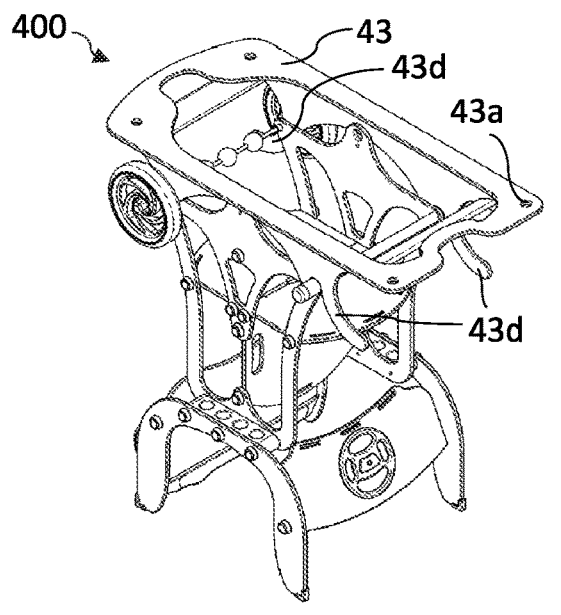
Figure 4.a
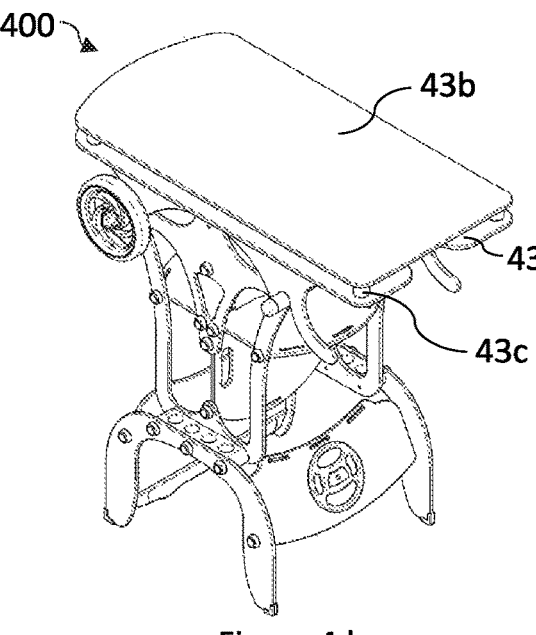
Figure 4.b

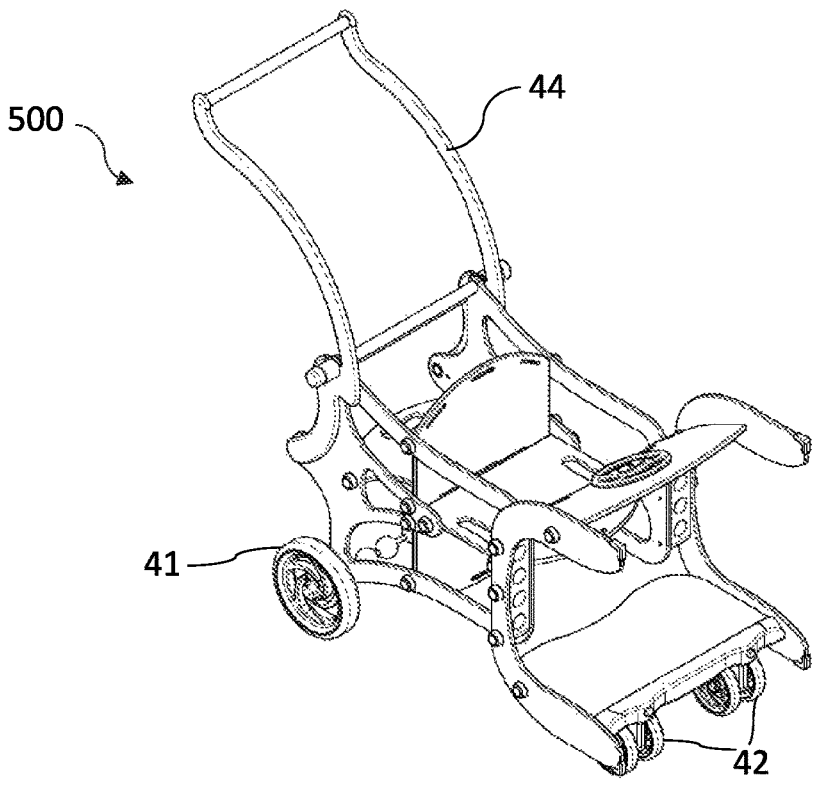
Figure 5
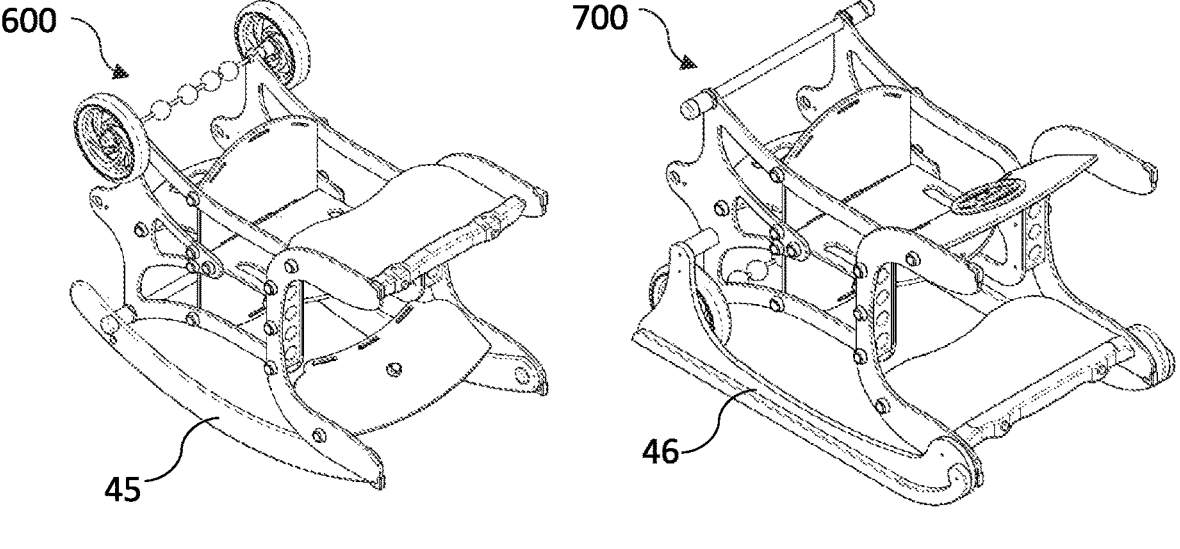
Figure 6.a             Figure 6.b

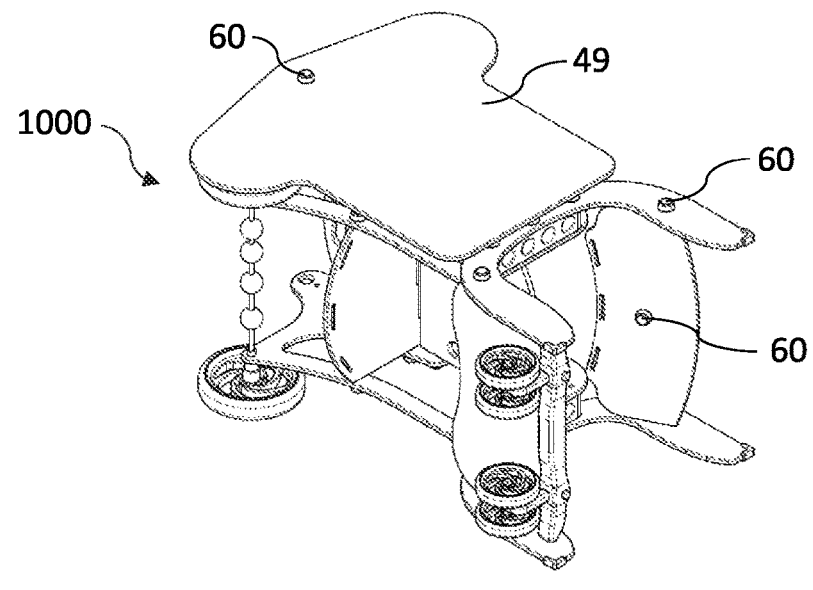
Figure 9
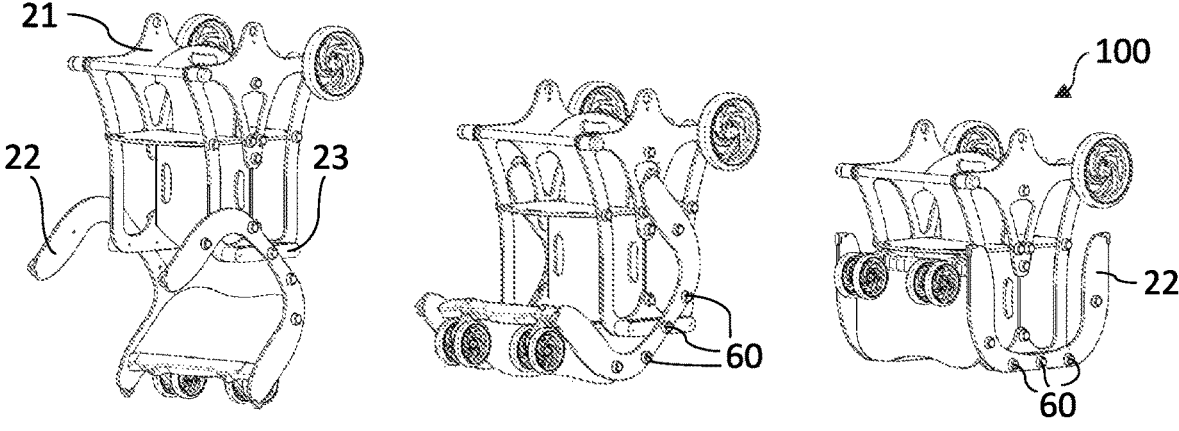
Figure 10.a          Figure 10.b          Figure 10.c
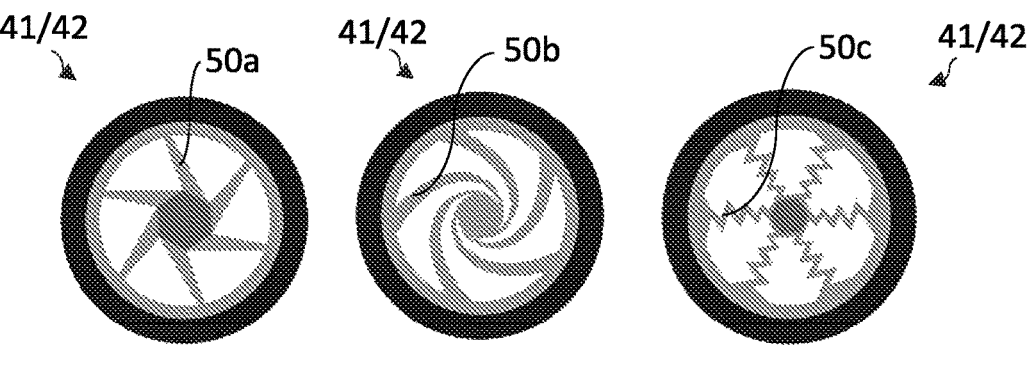
Figure 11.a          Figure 11.b          Figure 11.c

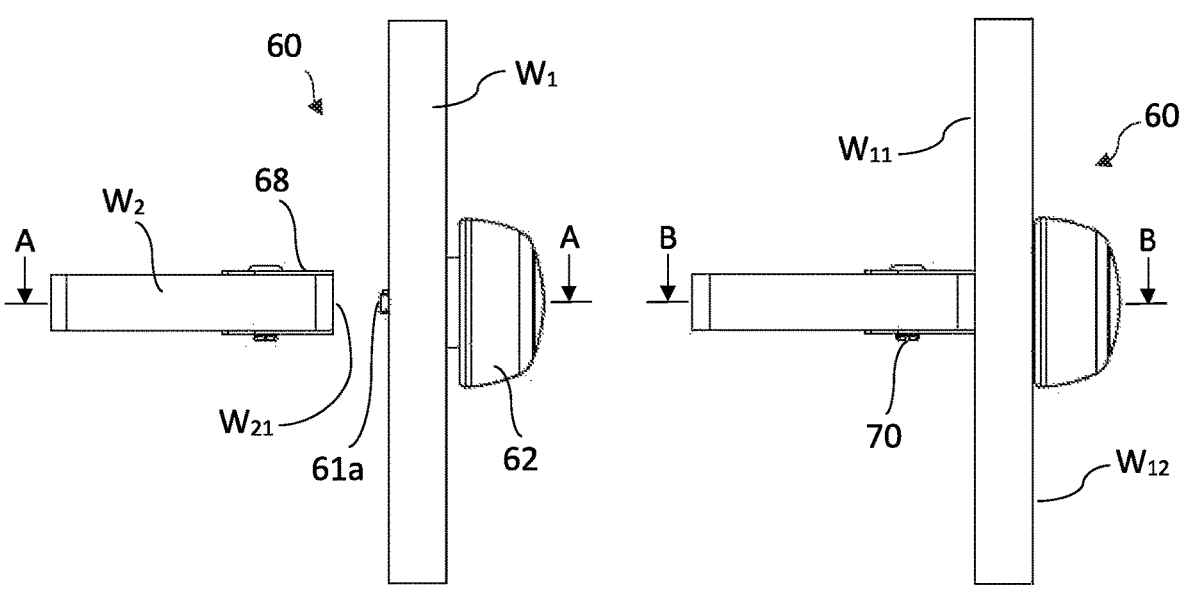
Figure 12.a                              Figure 12.c
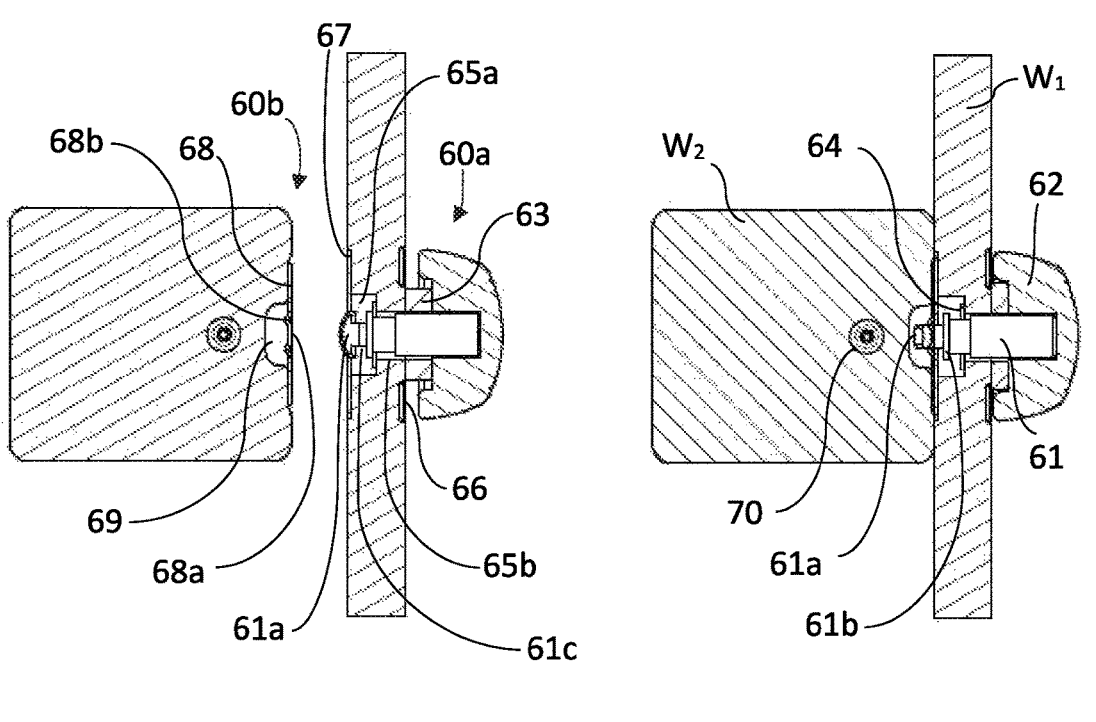
Section A-A                              Section B-B
Figure 12.b                              Figure 12.d

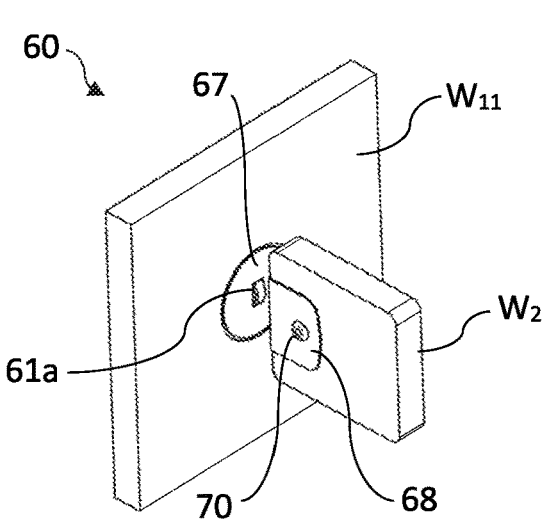
Figure 13.a
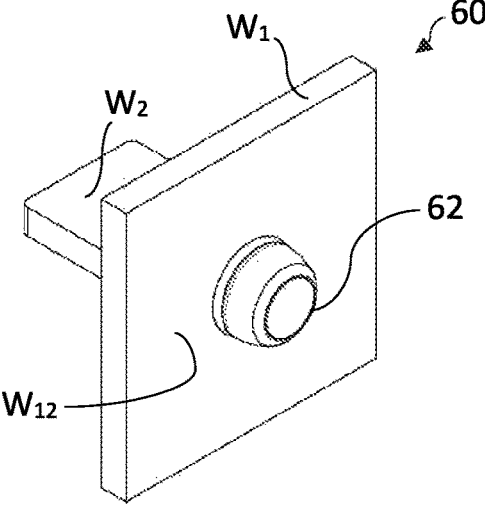
Figure 13.b
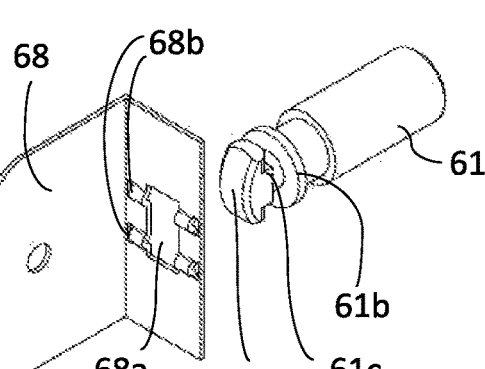
Figure 14.a
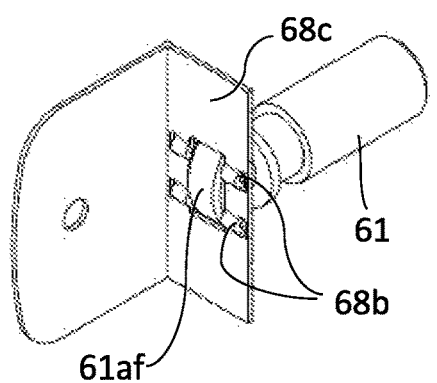
Figure 14.b
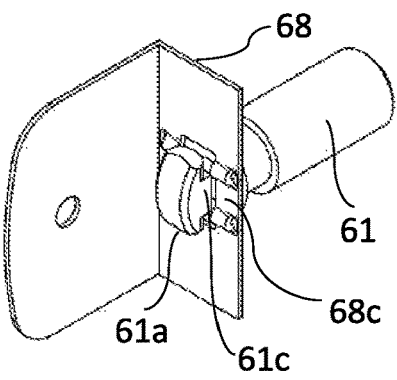
Figure 14.c
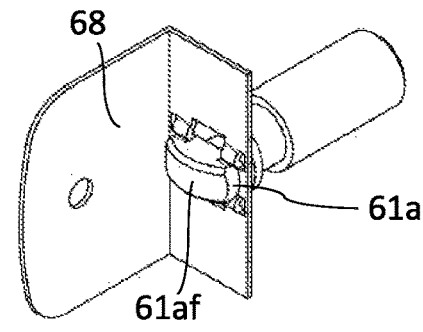
Figure 14.d

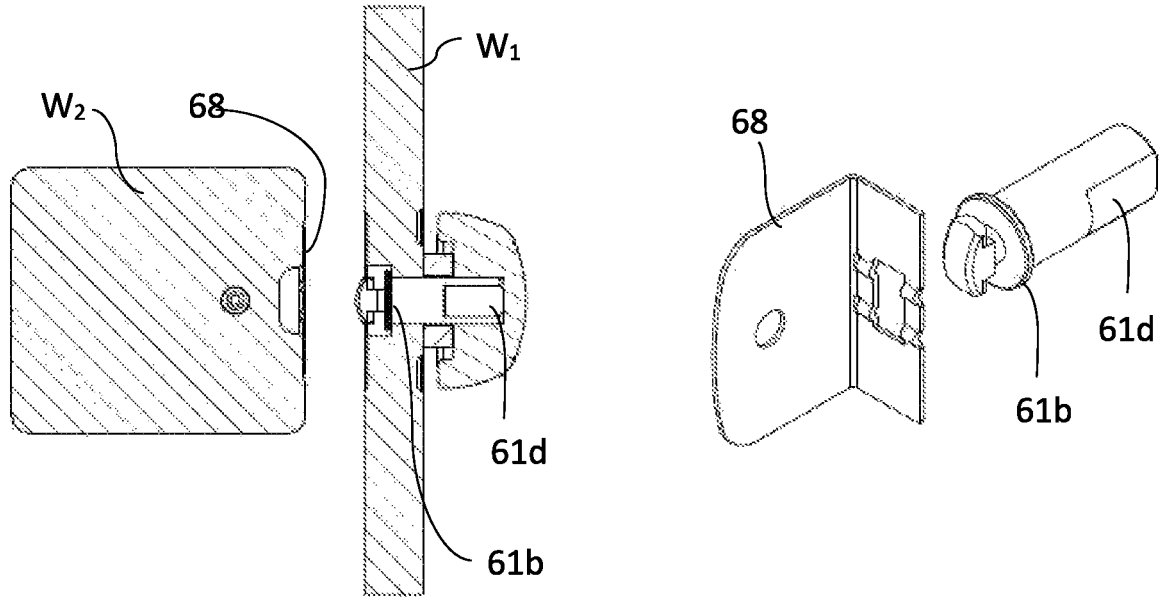
Figure 15.a                                      Figure 15.b
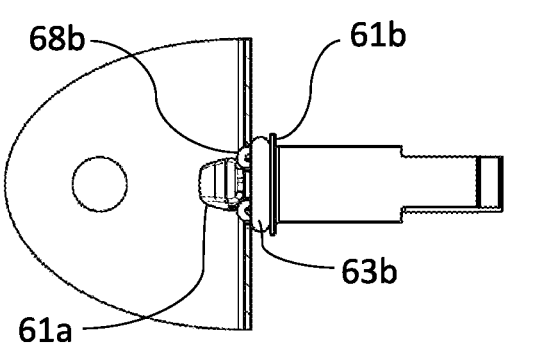
Figure 16.a                                      Figure 16.b
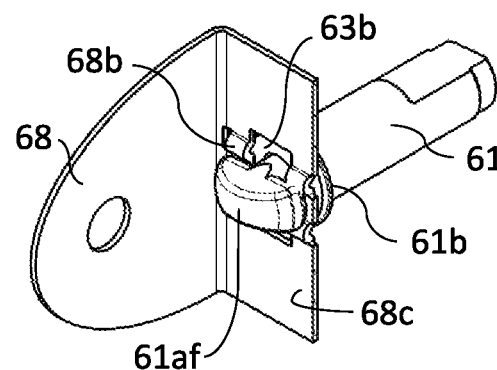

FURNITURE AND TOY ASSEMBLY FOR CHILDREN

TECHNICAL FIELD

The present invention relates to a convertible furniture and toy assembly for children, which has a symmetrical base unit and replaceable module elements that can be attached thereto.

BACKGROUND ART

The requirements for children's furniture, objects and utility goods designed for the age group 0-7 are very complex. The characteristic of these furniture is that children don't use them for long, as they quickly outgrow them, so parents are faced with having to buy another, bigger one instead of a recently purchased, expensive piece of furniture, and they have to take care of storing or selling the piece of furniture that has become redundant. This age group is also characterized by the fact that their interest in certain objects and toys changes more intensively than in other periods during the course of life. In addition, objects developed for small children must also meet serious safety conditions, and manufacturers of children's furniture and toys can only market objects that comply with more than the average standards.

A number of earlier, variable children's furniture-toy combinations are known, all of which primarily focused on varied use and the consequent space-saving design.

The basic function of utility model CN204105483U is a high chair, which—mainly due to its design—can also be used as a rocking chair when diverted. The adjustment option that can be made on the model is limited to changing the seat height that can be adjusted in the high chair function. European design models 3113554, 1233498, and 1765595 also provide additional functionality due to the products' special design, by which, without the possibility of adjustment, simply by changing the orientation of the products, the user gets a solution that works as other type of furniture—for example, a high chair, a rocking chair, a table.

The invention taught in patent document JP2014204946, which is considered to be the closest piece of prior art, is a multifunctional children's toy in which two curved side panels 100L, 100R are connected by rods 200 and plates of diverse shapes, and various additional elements can be attached to the base unit of the product assembled in this way (the reference marks in this paragraph are the characteristics of the examined previous solution). The essence of this solution is the design of connecting elements 300, 306, which ensure the attachment of the connecting rods 200 to the side panels 100L, 100R, enabling the child to play safely, while they do not disengage during use. At the two ends of the connecting rods 200, 201 blind holes are formed to receive middle pieces 300 each. The middle pieces are made extending across the holes 103 formed on the side panels, where the features 303, 102 of the middle piece and the hole of the side panels ensuring a form-locking connection prevent the connecting rods from rotating during use. A cap 306 is placed on the threaded section 305 of the middle pieces extending beyond the side panels, where flexible elements 307 are inserted between the cap and the side panels to increase the friction between them. The caps also have flat 306a surfaces that allow the use of a wrench. Although the toy can be transformed with the help of the connecting elements, and thus many functions can be achieved, the variability and usability of the product is still relatively limited. To convert the toy, when the connecting elements are released, they must be disassembled into several parts, which can cause the loss of individual parts, and is a time-consuming operation that may require tools.

SUMMARY OF THE INVENTION

With this invention, our goal was to develop an easily convertible, ergonomic assembly of children's furniture and skill-developing children's toy, as a utility good for children, with which, in addition to saving space, stability and safety can also be achieved, which are essential for small children users.

Our goal has been achieved by providing a furniture and toy assembly for children, which has a symmetrical base unit and at least one replaceable module element fixable thereto, wherein the base unit contains two side units arranged at an equal distance from its plane of symmetry and at least two connecting elements connecting the two side units; furthermore it is provided with a stabilizing system, in which the side unit of the base unit contains a first side element, a second side element and an intermediate side element connecting them, wherein the first side element is arranged at a predetermined distance X and the second side element is arranged at a predetermined distance X+Y+V from the plane of symmetry, wherein Y is the width of the intermediate side element and V is the thickness of the first side element, the value of X is between 110-300 mm and the value of Y is at least 10% of the value of X. Preferably the value of X is between 140-200 mm, the value of Y is at least 50 mm; and the value of V is between 6-20 mm, more preferably between 6-16 mm. Preferably the value of Y is at most 50% of the value of X, more preferably at least 30%.

Optionally the stabilizing system contains at least one module element which when attached to the base unit, the assembly is symmetrical to the plane of symmetry of the base unit.

Preferably the assembly can be set in a vertical position by turning the base unit along its plane of symmetry of, and one of the connecting elements of the base unit is a first connecting plate forming a child's seat.

Preferably the assembly can be set in a horizontal position by turning the base unit along its plane of symmetry, and one of the connecting elements of the base unit is a second connecting plate forming a child's seat.

Optionally the module element is a plate forming a table or a drawing board. Optionally the module element is a baby tab holder adapter, or a baby changing table adapted to be fitted thereto. Optionally the module element is a slide.

The assembly is preferably provided with at least two module elements, wherein the module element is an arched rocker or a sleigh runner.

Preferably the assembly is provided with at least four module elements, wherein the module element is a wheel. The stabilizing system preferably includes a wheel equipped with a flexible spoke element.

The module element is optionally a pushchair handle; or the module element is optionally a tent support frame adapted to be equipped with a tent tarpaulin.

The stabilizing system preferably also contains at least one connecting member for connecting the side units, connecting elements, and module elements together; which connecting member has an operating unit containing a pin, a handle fixed on one end of the pin, as well as an elastic element arranged around the pin and fitting to the handle; wherein on the end of the pin opposite the end containing the handle, a neck part and an elongated head part is formed, which neck part and head part together form a T-shape, and the at least one connecting member also contains a receiving unit having a plate, on which a plate opening is formed suitable for receiving and holding the head part after its turning, the shape of the opening corresponds to the shape of the largest cross-section of the head part, and the area of the opening essentially corresponds to the area of the largest cross-section of the head part. Preferably a collar is formed on the pin between the neck part and the handle.

The connecting member is suitable for connecting two structural elements, where both the first structural element and the second structural element can be a connecting element, a side element belonging to a side unit, or a module element according to the present invention. According to a preferred embodiment of the arrangement of the connecting member relative to the structural elements, the connecting member has an operating unit mounted on the first structural element and a receiving unit mounted on the second structural element; wherein the operating unit includes a pin arranged in a hole formed from a connecting first side of the first structural element to the opposite second side thereof, and a handle fixed to the pin on the second side of the first structural element.

On a connecting side of the second structural element, a cavity is formed in the second structural element; the receiving unit includes the plate covering the cavity, fixed to the second structural element, on which a plate opening is formed. On the end of the pin facing the first side of the first structural element a neck part and an elongated head part is formed, which together form a T-shape, wherein the shape of the plate opening made in the plate corresponds to the shape of the largest cross-section of the head part, and the area of which essentially corresponds to the area of the largest cross-section of the head part; further the operating unit contains an elastic element between the second side of the first structural element and the handle.

Preferably, a collar is formed on the pin between the neck part and the handle; and the hole includes a first section and a second section of smaller diameter than the first section, wherein the head part and the collar are arranged in the first section. Optionally the operating unit also contains a ring arranged on the pin the inner diameter of the ring is smaller than the diemeter of the second section, and the outer diameter thereof is larger than the diameter of the second section of the hole; wherein the ring is arranged in the first section of the hole. The ring is preferably a seeger ring.

The elastic element is preferably selected from the elements of the following group: silicone ring, rubber ring, rubber foam ring, corrugated washer, flexible washer, spring or combinations thereof. Preferably four protruding elements are formed on the plate of the receiving unit, protruding from the inner surface of the plate towards the cavity, around the plate opening, forming a nest for receiving the head part; wherein the edges of the protruding elements are rounded. Preferably the end surface of the head part is curved and/or rounded along its edges.

The handle is preferably attached to the end of the pin opposite the end on which the head part is formed by means of an unreleasable connection, for example by gluing. The operating unit preferably contains a cover plate arranged on the first side of the first structural element, on which cover plate an opening is formed; furthermore the head part of the first structural element is arranged to extend from the cover plate by 0.2-2 mm, preferably by 0.5 mm. The second structural element is optionally a sheet, and the plate arranged on it is preferably fixed to the second structural element with a pair of furniture screws.

BRIEF DESCRIPTION OF THE DRAWINGS

In the following, the invention will be described in detail with the help of the drawing, in the drawing the FIG. 1.$a$ shows the base unit of the furniture and toy assembly according to the invention, with a pair of wheels module element and additional elements arranged on its axis, in a vertical position, FIG. 1.$b$ is a general illustration of the stabilization system of the furniture and toy assembly according to the invention, where the symmetrical arrangement of the module elements is represented by a pair of wheels and a feeding table, FIG. 2.$a$ is an advantageous embodiment of the furniture and toy assembly according to the invention, in a horizontal position, in the function of a small car, with an additional toy steering wheel, FIG. 2.$b$ shows a preferred embodiment of the furniture and toy assembly according to the invention, in a horizontal position, with a drawing board module attached to it, FIGS. 3.a-cshow the base unit supplemented with the wheel pair module element in front, side and top views, FIG. 3.$d$ is a seat cover module element that can be pulled onto the first and second connecting plates of the base unit, which also function as a seat FIG. 4.$a$ is a preferred embodiment of the furniture and toy assembly according to the invention, in a vertical position, with a baby tub holder adapter, FIG. 4.$b$ is the embodiment according to FIG. 4.$a$ with a diaper changing sheet, FIG. 5 is an advantageous embodiment of the furniture and toy assembly according to the invention, in a horizontal position, with two wheels and push handle module elements, in the function of a stroller, FIG. 6.$a$ is an advantageous embodiment of the furniture and toy assembly according to the invention, in horizontal position, rocking chair function, FIG. 6.$b$ shows an advantageous embodiment of the furniture and toy assembly according to the invention, in a horizontal position, with a sled function, FIG. 9 is another embodiment of the furniture and toy assembly according to the invention, in a sideways position, with a work table-top module, FIGS. 10.a-c show the process of setting the base unit in the storage and transport position, FIGS. 11.a-c are versions of the flexible spokes of the wheel module elements, which optionally form an element of the stabilization system, FIGS. 12.a-b are side view and cross-sectional representations of the connecting member, which is an optional element of the stabilization system, in the disconnected state, on the structural elements to be connected, FIGS. 12.c-d are side view and cross-sectional representations of the connecting member, which optionally forms an element of the stabilization system, in the connected state, on the connected structural elements FIGS. 13.a-b are perspective views of the connecting member, FIGS. 14.*a-d* show the pin of the operating unit of the connecting member, as well as the plate of the receiving unit that receives and holds the pin during the connection process, FIGS. 15.*a-b* are cross-sectional and perspective representations of the connection elements of the (seeger) ringless versions of the connecting member, FIGS. 16.*a-b* show the pin of the operating unit of the connecting member, as well as the plate of the receiver unit that accommodates and holds the pin in a side view, and axonometrically, with the elastic ring arranged on the neck of the pin (version without seeger ring).

DETAILED DESCRIPTION

Figure 7:
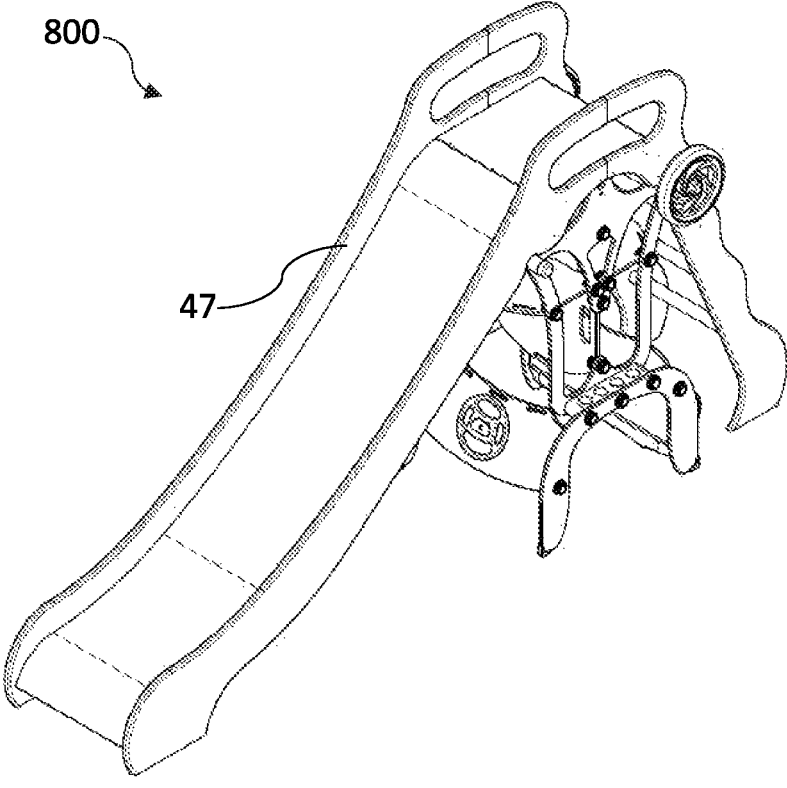
FIG. 7 shows an advantageous embodiment of the furniture and toy assembly according to the invention, in a vertical position, with a slide module element.

FIGS. 1.*a-b* illustrate the first embodiment 100 of the furniture and toy assembly for children 100, 200, 300, 400, 500, 600, 700, 800, 900, 1000 according to the present invention, where the furniture-toy combination 100 can mostly be used as a high chair. In FIGS. 1.*a-b* the assembly 100 is shown in a vertical orientation, in this case, during application the largest extent of the assembly 100, i.e. its length, stretches in the vertical direction.

FIG. 1.*a* shows the symmetrical base unit 10 of the furniture and toy assembly 100-1000 according to the invention, which includes two side units 20 arranged parallel to each other and at an equal distance from the plane of symmetry S (FIGS. 1.*b*, 3.*b*, and 3.*c*) of the base unit 10, as well as symmetricallly thereto, and at least two connecting elements 31, 32*a*, 32*b*, 33, 34, 35, 36*a* arranged perpendicular to the two side units 20 and to the plain of symmetry S, for connecting the two side units 20. The plane of symmetry S therefore streches halfway between the two side units 20, streching in the middle of the connecting elements 31, 32*a*, 32*b*, 33, 34, 35, 36*a*, theoretically cutting them into halves.

In the Figures of this application, we essentially illustrate a side unit 20 of a certain design, but that can also be made in many other versions that are attractive to children, stimulating play and use, which versions differ from each other in their form and color scheme, thus further increasing the variability of the composition 100-1000, which ensures a wealth of stimuli. The points ensuring the connection of the side units 20 of different design to other units and elements, and in particular to the connecting elements 31, 32*a*, 32*b*, 33, 34, 35, 36*a*, were located in constant places, thereby ensuring the easier production of side units 20 of different types and shapes, and, where applicable, simplifying the replacement of the side units 20 already available for a given user-due to possible wear as well as variability. At these fixed points, the connection of the various elements to each other is mainly solved by using quick-connecting members 60, which are also intended to increase the stability of the present invention, as detailed later.

In general, the connecting elements can be rods or various plates. The connecting elements shown in FIGS. 1.*a-b* are the first connecting plates 31, typically forming a child's seat, which are part of most embodiments of the invention; the high chair shown in FIGS. 1.*a-b* also contains two pieces thereof. The second connecting plates 32*a* and 32*b* also make such an advantageous connecting element, which are arranged perpendicular to the first connecting plate 31, one of which, i.e. the upper piece 32*a* in the orientation shown in FIGS. 1.*a-b* can be used as a backrest in the vertical orientation of the assembly 100. This connecting element 32*a*, which functions as a backrest in the vertical orientation, separates the two first connecting plates 31, enabling two small children to occupy their place in the assembly 100 at the same time: one located facing a removable feeding tray 40 according to FIG. 1.*b*—which forms a module element— on the connecting plate 31 here functioning as a feeding chair, while the other child being located in the other chair (on the second connecting plate 31) arranged with his back to the first one, facing an engaging element, such as a string of beads (FIGS. 1.*a-b*). Additional connecting elements illustrated in FIGS. 1.*a-b* can be a rod 33 supporting the feeding tray 40; a rod 34 holding an engaging element, e.g. the string of beads and forming a wheel axle; as well as opposite plates 35, 36*a* connecting the pair of second side elements 22. One of these two plates 35, 36*a* can be a plate 35 shown in FIG. 2.*a*, equipped with a toy steering wheel, i.e. a toy dashboard, which is focussed in another function of the assembly 100 (shown in FIG. 2.*a*), in FIG. 1.*b* it illustrates the variability of furniture-toy combinations 100. In the same way, the other connecting plate 36*a* is for holding a plate forming a drawing board 36*b*—a module element—, fixed at an obtuse angle, approximately 120 degrees, which will be presented later on in FIG. 2.*b*.

FIG. 1.*a* essentially depicts the general base unit 10 of the assembly 100-1000 (disregarding the pair of wheels 41 and the string of beads illustrated on the same rod 34, i.e. axle).

The invention is characterized by the fact that it is provided with a stabilizing system 80, the development of which was inspired by the safety of children users. The stabilizing system 80 shown in FIG. 1.*b* has four aspects, which are as follows:

as an essential feature, the enhanced stability of the side units 20 relative to the base unit 10 in both vertical and horizontal orientations, is achieved by inserting an intermediate side element 23 of width Y (detailed below), the use of which also multiplies the variability of the assembly 100-1000;

optionally, the use of safety quick connecting members 60 to connect the structural elements of the assembly 100-1000, i.e. the plates and elements of the side unit, the connecting elements, and the module elements to each other;

where appropriate, the application of only those module elements 32*c*, 36*b*, 40-43, 43*b*; 44-47, with which a symmetrical children's furniture-toy assembly 100-800 is obtained even after being connected to the base unit 10, which symmetry also increases the stability of the invention. FIG. 1.*b* shows two module elements of this type and arrangement: the pair of wheels 41 and the feeding tray 40;

optionally, the use of wheels 41, 42—as module elements- which are equipped with flexible spokes 50*a-c*, thus increasing the stability of the assembly 100-1000 which passes through obstacles and resists their shape elastically.

The application of the first aspect of the stabilizing system 80 in itself provides a safe and, at the same time, highly advantageous multifaceted application of consumer objects designed for children. The combination of this first characteristic with the other optional stabilizing functions greatly increases the stability and safe applicability of the furniture and toy assembly for children according to the invention.

The first aspect of the stabilizing system 80 is best illustrated in FIGS. 1.*b* and 3.*a-c*. It is a characteristic of the invention that each side unit 20 located on both sides of the base unit 10 contains a first side element 21, a second side element 22 and an intermediate side element 23 connecting them, where the first side element 21 is at a distance X from the plane of symmetry S and the second side element 22 is arranged X+Y+V therefrom, where Y is the width of the intermediate side element 23 and V is the thickness of the first side element 21. The basis of the inventive realization is that in the vertical position shown in the Figures, the inserted intermediate side element 23 with a width of Y unexpectedly increases the variability of the 100-1000 assembly and at the same time the stability that ensures safe use. In this way, among other things, it allows us to store various objects on it, so holders, such as a cup holder, can be created/arranged on it. In order to achieve these technical effects, it is essential that the absolute and relative size of X and Y dimensions be established as follows: the value of X is between 110-300 mm, preferably 140-200 mm and the value of Y is preferably at least 50 mm. It is essential that the value of Y is at least 10%, preferably 30% of the value of X. The intermediate side element 23, which does not contain support elements, is uninterrupted or has a surface with anti-slip knurling (not shown), can also be used as a stepper in the vertical position of the assembly 100 for small children of a certain age, typically 2-6 years, provided that the value of Y is at least 10 of the value of X %, preferably 30%. Ensuring stability is especially important for assemblies 100, 400, 800 standing in the vertical position. Accordingly, the initially symmetrically designed base unit 10 has increased stability due to the interposed intermediate side elements 23. In this way, the pair of first side elements 21 being closer to each other in the assembled furniture and toy assembly require less space, while the pair of second side elements 22 arranged at a greater distance from each other increase stability.

In addition, if the base unit 10 is disassembled for transport or possible longer storage, by removing the intermediate side elements 23 on both sides, its pair of first side elements 21 can be practically slid into the pair of second side elements 22, which also contributes to the small space requirement of this toy-furniture combination 100-1000. As an alternative to this—as illustrated in FIGS. 10.*a-c*—the removal of the intermediate side element 23 can even be omitted by rotating the pair of second side elements 22—forming the legs—by 180 degrees from its position of use. For this, it is necessary to first remove the connecting element 35, which functions as a toy dashboard, and to disconnect the two outermost quick-connecting members 60 out of the three which connect the intermediate side element 23 with the second side element 22, while the central quick-connecting member 60 is left in its connecting state, and the second side element 22 are rotated around it. After turning, the two outer connecting members 60 are reactivated and the connecting plate 35 can also be reinstalled. Both the sliding into each other, which requires the removal of the intermediate side elements 23, and the rotation without the removal of the intermediate side elements 23 are greatly facilitated by the size selection of the intermediate side elements 23 according to the invention, namely that the value of Y is at least 10%, preferably 30% of the value of X; furthermore, the value of Y is at most 50% of the value of X.

As we mentioned before, during the development, a lot of emphasis was placed on determining the dimensions. Because of the ergonomic furniture design, which is also set as a goal, it is important that the individual dimensions are anthropometric. Accordingly, the value of X is between 110-300 mm, preferably between 140-200 mm. It is essential that the value of Y is at least 10%, preferably 30% of the value of X. Also, the value of Y is ideally at least 50 mm. Furthermore, the value of Y is at most 50% of the value of X, a limit that we need to insert due to usability. For the stiffness of the connecting and side plates, and thus for the stability of the assembly 100-1000, it is important to choose the appropriate thickness of these parts, according to which the thickness V of the first side panel 21 is preferably between 6-20 mm, more preferably between 6-16 mm, and the thickness of the second side plate 22 is the same as the first side plate 21. The thickness of the connecting plates 31, 32*a*, 32.*b*, 35, 36*a* also approximately equals the thickness value of V.

The basic feature of the variability of the furniture-toy combinations, assemblies 100-1000 according to the invention is that various replaceable module elements 32*c*, 36*b*, 40, 41, 42, 43, 43*b*, 44, 45, 46, 47, 48, 49 can be attached to the base unit 10, where the module elements are attached to the base unit 10 by connecting elements. As an optional feature of the stabilizing system 80, any of the module elements 32*c*, 36*b*, 40-43, 43*b*; 44-47 are attached to base unit 10, by which the assembly 100-800 remains symmetrical to the plane of symmetry S of base unit 10, thus enhancing the stability of the furniture-toy combination 100-700. The most relevant module element shown in FIG. 1.*b* is the feeding tray 40, the connecting element 40*a* of which partially surrounds the connecting rod 33 in a hanging manner, and is also attached to the first side element 21 with screws.

FIG. 2.*a* is basically a version of the embodiment 100 shown in FIG. 1.*a-b*, arranged horizontally and equipped with wheels 41, 42, which can be used as a small car (without the feeding tray 40). The wheels 41 are arranged on both sides of the first side element 21 on a common axis. The pairs of wheels 42 are arranged on a connecting or module element functioning as a child's table or a drawing board between the second side elements 22, each pair sharing an axle. In order for the axles of the wheel pairs 42 to operate as stably, accurately and robustly as possible, it is advantageous if the axles of the individual wheel pairs 42 are as long as possible. In order to provide space for this increase in axle length, it is also important that the width Y of the intermediate side element 23 is at least 10%, preferably 30%, of the distance X of the first side element 21 measured from the plane of symmetry S. The connecting elements of the base unit 10 are the second connecting plates 32*a* and 32*b* forming child seats, so two small children can fit while "driving" the toy car, or several children can use it. According to the Figure, one of the preferably used first 31 connecting plates serves as a backrest in this case. The wheels 41, 42, which are rotatably fixed as module elements, as well as the space provided for the feet of the young user, enable the assembly to be moved by a small child. In this case, even a toy gear lever or handbrake can be applied onto the intermediate side elements 23, thus enhancing the gaming experience. The condition for this is that the size of the width Y of the intermediate side element 23 according to the invention, namely the value of Y should be at least 10%, preferably 30% of the value of X. For ergonomic design, in the case of the assemblies 100-300, 500-700 used in both the vertical and horizontal positions, a seat cover 32*c* can be placed on the plates 31 and 32*a*, 32*b* (connecting elements), which is illustrated in FIG. 3.*d*. The module element 32*c* not only has a comfort function, but also covers the gripping gap formed on the plates 31, 32*a*, 32*b*, thereby preventing the small child's hand from getting stuck in these gaps, which are basically designed to facilitate transportation and grasping, during play.

The embodiment 300 of the assembly shown in FIG. 2.*b* functions as a children's table 36 or as a drawing board. In this case, the module element is the tabletop 36*a*, which also functions as a connecting element. On the connecting plate 36*a*, a sheet forming the drawing board 36*b* fixed with a pair of fixing elements 36*c* makes an obtuse angle, preferably 120 degrees, with the horizontal (the sheet 36*a*) as can be seen in FIG. 2.*b*, so it can also be used as a "whiteboard" (for drawing purposes or, for example, in its magnetic version, for attaching certain elements to the board). The size selection of the width Y of the intermediate side element 23 according to the invention, namely that the value of Y should be at least 10%, preferably 30% of the value of X, further contributes to the fact that both the module element 36 functioning as a child's table or a drawing board, as well as the module element 35 module usable as a dashboard can be as wide as possible, thereby increasing the size of the playing field and the applicability of the surfaces. As a result, more and more didactic, stimulating elements can be added to them, e.g. stickers, indentations, holes, and other accessories can be placed or formed on them. Since both module elements 35 and 36 are also connecting elements, if the value of Y is at least 10%, preferably 30% of the value of X, the stability of the invention is increased in all its positions.

FIG. 3.*a* is a front view of the assembly 200 functioning as a small car shown in FIG. 2.*a*, FIG. 3.*b* is a side view thereof, and FIG. 3.*c* is a top view thereof. FIGS. 3.*b-c* clearly show the arrangement of the two side units 20, the plane of symmetry S of the base unit 10, and the X, Y, V distances measured from it, which are characteristic of all embodiments of the invention.

FIG. 4.*a* shows the baby bathing application 400 of the vertically positioned applications of the assembly according to the invention, and FIG. 4.*b* shows the diaper changing application. In both cases, the module element is a baby tub holder adapter 43, the two fixing points of which are connected to the connecting rods 33 and 34, respectively. The four legs 43*d* of the baby tub holder adapter 43 are designed to engage or rest into/on the respective rods 33, 34, as shown in FIGS. 4.*a-b*. This fourth version embodies the earliest use of the assembly 100-1000 during a child's growth. Four holes 43*a* are formed in the corners of the baby tub holder adapter 43, into which the four legs 43*c* of the diaper changing table 43*b* can be positioned (FIG. 4.*b*).

FIG. 5 shows the application 500 of the horizontal applications of the assembly according to the invention, the stroller, or also known as baby carriage, where the module elements are the wheels 41, 42 and the push handle 44.

As an optional feature of the stabilizing system 80, the special design of the wheels 41, 42 is illustrated in FIGS. 11.*a-c*, where the wheels are equipped with at least one flexible spoke element 50.*a-c* to ensure a greater degree of shock absorption and to make the passing through certain obstacles more uniform. The flexible wheel spoke 50.*a-c* can be of rubber (FIGS. 11.*a* and 11.*b*) or of metal spring design (illustrated in FIG. 11.*c*).

FIGS. 6.*a* and 6.*b* show the rocking chair application 600 and the sled application 700, respectively, among the horizontal applications of the assembly according to the invention. In these cases, the module elements are a pair of arched rockers 45 and a pair of sled runners 46, respectively.

FIG. 7 shows the slide application 800 among the vertical applications of the assembly according to the invention, where the module element is a slide 47, which essentially rests on the base unit 10.

Figure 8:
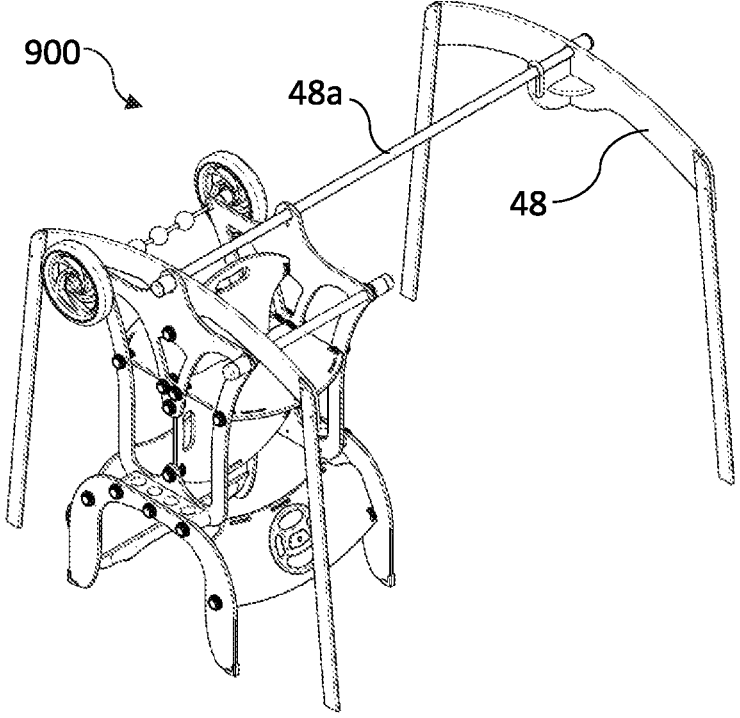
FIG. 8 is another embodiment of the children's furniture and toy assembly according to the invention, in a vertical position, with a tent support frame module element.

FIG. 8 shows the tent application 900 among the vertical applications of the assembly according to the invention, where the module element is a tent support frame 48 suitable to be equipped with a tent tarpaulin, the upper rod 48*a* of which is passed through a hole of the first side panel 21 designed for this purpose.

FIG. 9 is the result of a special rotation among the vertical applications of the assembly according to the invention, here the assembly 1000 is not rotated along the plane of symmetry S, but along a plane perpendicular thereto, so in this case the plane of symmetry S is parallel to the plane of the ground. A plate 49 can be attached to the base unit as a working table, and a safety connecting member 60 can be used to attach it.

A further optional feature of the stabilizing system 80 is that at least one connecting element of the assembly 100-1000 is a connecting member 60 enabling a safety quick connection. A preferred embodiment of the connecting member 60 is described with the help of FIGS. 12.*a-d*, 13.*a-b*, 14.*a-d* and 15.*a-b*. The connecting member 60 is suitable for connecting two structural elements, in the Figures these are generally marked with plates $W_1$ and $W_2$ to be connected. Both $W_1$ and $W_2$ can be any connecting elements 31, 32*a*, 32*b*, 35, 36*a* according to the invention, side elements 21, 22, 23 belonging to side unit 20, and also module elements 36*b*, 40, 43, 43*b*, 44, 45, 46, 47, 48, 49. Although in FIGS. 12.*a-d*, 13.*a-b*, 14.*a-d* and 15.*a-b* we illustrate the structure of the connecting member 60 through the connection of sheet-like structural elements $W_1$, $W_2$, it can also be used for a block-like element, for example the intermediate side element 23, in the simplest way by adapting the plate 68 of the receiving unit 60*b* to the block element, detailed later.

As indicated in FIGS. 12.*a-b*, the connecting member 60 consists of two units, on the one hand, the operating unit 60*a* arranged in and associated with the element $W_1$, and on the other hand the receiving unit 60*b* arranged and associated with the element $W_2$. The side view according to FIG. 12.*a* and the section taken on the line A-A according to FIG. 12.*b* show a state where the two elements $W_1$, $W_2$ are not yet connected. In the side view of FIG. 12.*c* and in the section according to FIG. 12.*d* taken along line B-B, the connected state of the two elements $W_1$, $W_2$ can be seen, so here—as detailed later—the pin 61 has already been pushed into a cavity 69, and a 90-degree turning thereof by the handle 62 has already been done.

The operating unit 60*a* contains a pin 61, which extends slightly, approximately by 0.2-2 mm, preferably by 0.5 mm, on the first, connecting side $W_{11}$ of the element $W_1$; and on the second side $W_{12}$ of element $W_1$, which is opposite to the first side $W_{11}$ it extends to a greater extent. An elastic element 63 is attached to the section of the pin 61 extending beyond the second side $W_{12}$ of element $W_1$, and for safety reasons, a rounded operating handle 62 is fixed with an unreleasable connection (for example, by gluing, or by notching the surfaces and then pressing them; FIG. 13.*b*). In this way, the handle 62 has a (blind) hole for receiving the pin 61, as well as an indentation that ideally ensures the movement of the elastic element 63 on the pin 61 and its expansion in the axial direction due to pressure. A groove 66 is formed on the second side $W_{12}$ of element $W_1$ for receiving the handle rim formed after forming of this indentation for its firm fitting. For the (partial) form-locking, anti-rotational connection of the pin 61 in the handle 62, these parts have at least a one-sided flat surface 61*d*, as shown in FIGS. 15.*a-b*.

A head part 61*a* and a neck part 61*c* are formed at the end of the pin 61 at the first side $W_{11}$ of element $W_1$, which neck part 61*c* and head part 61*a* together form a T-shape. Furthermore, a collar 61*b* is preferably formed on the pin 61 in order to keep the operating unit 60*a* in the element $W_1$. To perform their function, the parts 61*a-c* are placed in a hole section 65*a* formed in the element $W_1$. During operation the pin 61 itself moves in the through hole consisting of a first section 65$a$ and a second section 65$b$ formed in the element W$_1$. The falling out of the pin 61 is basically prevented by the collar 61$b$, and this is also enhanced by a ring 64, e.g. a seeger ring arranged at a back wall of the hole section 65$a$. The ring 64 can be omitted if the diameter of the collar 61$b$ ensures that the operating unit 60$a$ does not fall out of the element W$_1$. FIGS. 15.$a$-$b$ show the version without ring 64. The pin 61 is rotationally symmetrical over most of its length, but the head part 61$a$ has a flattened design on two of its sides. The curved head part 61$a$ formed in this way, rounded on its end face 61$af$ and along its edges, with the appropriate dimensions, protrudes to the mentioned extent from the opening of the cover plate 67 arranged on the first side W$_{11}$ of element W$_1$ (FIGS. 12.$b$ and 13.$a$). The elastic element 63 can be, among others, a spring, silicone ring, rubber ring, rubber foam ring, corrugated washer, flexible washer, pair of lens-shaped, air-trapping plates, etc., which can be pulled onto the pin 61 or fitted to it.

The other part of the connecting member 60 is the receiving unit 60$b$ arranged on the element W$_2$. The unit 60$b$ comprises a cavity 69 formed in the element W$_2$, on its connecting side W$_{21}$ facing the structural element W$_1$, suitable for receiving the head part 61$a$; as well as a plate 68 covering the cavity 69, fixed to the element W$_2$. If the element W$_2$ is a sheet, then the plate 68 is ideally a U-shaped plate illustrated in FIGS. 12.$a$-$d$ and 13.$a$, which surrounds the element W$_2$, and by means of a fastening pair 70 (which is preferably a pair of fastening elements used for furniture) is attached to the element W$_2$. A plate opening 68$a$ is cut out on the plate 68 (FIGS. 12.$b$ and 14.$a$), around which on the inner surface 68$c$ of the plate 68 on the side contacting element W$_2$, preferably four, and preferably semi-cylindrical protruding elements 68$b$ are formed, as shown in FIGS. 14.$a$-$d$. In general, on the plate 68 of the receiving unit 60$b$, around the plate opening 68$a$, four protruding elements 68$b$ are formed, creating a nest for receiving the head part 61$a$, the edges of which are rounded.

In the course of connecting the elements W$_1$ and W$_2$ to each other, the pin 61 of the operating unit 60$a$ is pushed into the cavity 69 of the receiving unit 60$b$, during which it passes through the plate opening 68$a$. After passing through, by turning the operating handle 62 by a quarter turn (90 degrees), the pin 61 and thus its head part 61$a$ also rotates—this process can be seen in FIGS. 14.$a$-$d$—and the head 61$a$ fits into the position (nest) defined by the four protruding elements 68$b$. Due to the curved design of the head part 61$a$ and the protruding elements 68$b$, these two types of elements 61$a$, 68$b$ easily roll on each other's surfaces, so that both connecting and disconnecting ensure a firm, reliable connection, and by applying the appropriate force and torque-which can be exerted by an adult person—they are easily manageable processes.

An important characteristic of the connecting member 60 is that, due to the retraction effect of the elastic element 63, in the connected state, the back surface of the head part 61$a$ is stretched against the inner surface 68$c$ of the plate 68 arranged on the receiving unit 60$b$, thus providing a pulling force that prevents the connecting member 60 from loosening during use. In addition, the flexible element 63 prevents the elements of the operating unit 60$a$ from moving (from wobbling) with respect to each other and to the element W$_1$, even when the connecting member 60 is disconnected, thereby avoiding the wear of large safety risk of the elements of the operating unit 60$a$, and in particular the element W$_1$.

For the purpose of changing function—after disconnecting the pin 61 and the plate 68 of the connecting member

60—, a specific element W$_1$, W$_2$ is removed from the assembly 100-1000, for example the connecting elements (seats/backrests) 31, 32$a$, 32$b$, due to the the collar 61$b$ and/or the ring 64, the disconnected parts of the connecting member 60 stay in place, that is in/on the corresponding element W$_1$, W$_2$, and so they do not fall out or hang out of the plane of the corresponding connecting side W$_{11}$, W$_{21}$ of the given element W$_1$, W$_2$, in such a way that a child playing or using the assembly 100-1000 could be injured. By grasping the handle 62 on the second side W$_{12}$ of the structural element W$_1$ and turning it in any direction by a quarter of a circle, we can disconnect or connect the two elements W$_1$, W$_2$, let they be arranged either parallel or perpendicular to each other. A great advantage of the connecting member 60 of the stabilizing system 80 according to the invention is that it is not necessary to disassemble the entire assembly 100-1000, or the base unit 10, if we want to replace a module element, as it is necessary to do in the solution taught in patent document JP2014204946, which is considered the closest prior art, by disassembling its connecting rods and the middle parts arranged in them.

In order to facilitate the connection of the elements W$_1$, W$_2$, the connecting member 60 can easily be positioned to the cavity 69 formed in the element W$_2$ or to the plate opening 68$a$ due to a small, typically 0.2-2 mm, preferably 0.5 mm protruding of the rounded head part 61$a$ from the plane of the first side W$_{11}$ of element W$_1$.

FIGS. 16.$a$-$b$ show the pin 61 of the operating unit 60$a$ of the connecting member 60, as well as the plate 68 of the receiving unit 60$b$ that receives and holds the pin 61 in a side view (FIG. 16.$a$) and axonometrically (FIG. 16.$b$); the pin 61 being provided with a elastic ring 63$b$ arranged around its neck part 61$c$, in the closed state of the connecting member 60. The elastic ring 63$b$ is preferably made of rubber or silicone or any other suitable elastic material that makes the connection possible. The use of the elastic ring 63$b$ greatly enhances the definite and precise fitting of the head part 61$a$ into the receiving unit 60$b$ of the connecting member 60, and its closing after its turning.

The connecting member 60 is essentially a quick switch, it is easy for an adult to use, however, both connecting and disconnecting requires the application of forces and torques of a magnitude and direction that a child cannot exert, therefore during the play or use, the disconnection of the connecting member 60 is excluded.

The structural elements W$_1$, W$_2$ of the assembly 100-1000, i.e. the elements 21, 22, 23 of the side unit 20, the connecting elements and the module elements 36$b$, 40, 43, 43$b$, 44, 45, 46, 47, 48, 49 are preferably made of natural and they environmentally friendly materials, typically using the following materials: plywood, beech wood, MDF, or a newly developed, bactericidal and virus-killing material with the fancy name of 'kryon', which is colored in its material, as well as combinations of these.

An advantage of the invention is, among others, that the various functions of the base unit 10 and the module elements 32$c$, 36$b$, 40, 41, 42, 43, 43$b$, 44, 45, 46, 47, 48, 49 that can be connected to it, adapt to the child's age, so to speak 'grow together with the child'. It can be easily extended with module elements to achieve more user functions. In the case of most embodiments, two children can sit in it simultaneously, and several children can use it, which provides space for social activities. Furthermore, in order to increase variability, side elements of other shapes and types can be attached to the same connection points, with which all module elements are compatible and can be used both outdoors and indoors. In addition, it is not necessary to purchase other tools, toys or furniture, which are replaced by the connectable module elements. The assembly 100-1000 stimulates children in several ways and in several areas at the same time: creativity, combinatorics, need for movement, motor skills, fun, learning, playing.

One of the most important characteristics of the furniture and toy assembly 100-1000 according to the invention is, however, the safe use resulting from the symmetrical, stable, and reliable design of its structural and connecting elements, which is a primary consideration for devices designed for children.

The invention claimed is:

1. A furniture and toy assembly for children, wherein the furniture and toy assembly comprises:
   a symmetrical base unit; and
   at least one replaceable module element fixable thereto;
   wherein the base unit contains:
      two side units arranged parallel to each other and at an equal distance from a plane of symmetry, as well as symmetrically thereto; and
      at least two connecting elements arranged perpendicular to the two side units and to the plane of symmetry, connecting the two side units;
      a stabilizing system;
   wherein the side unit of the base unit contains:
      a first side element;
      a second side element; and
      an intermediate side element connecting the first side element and the second side element;
      wherein the first side element is arranged at a predetermined distance X from the plane of symmetry, and the second side element is arranged at another predetermined distance X+Y+V from the plane of symmetry;
      wherein Y is a width of the intermediate side element and V is a thickness of the first side element; and
      wherein the value of X is between 110-300 mm and the value of Y is at least 10% of the value of X.

2. The furniture and toy assembly for children according to claim 1, wherein the value of Y is at most 50% of the value of X and the value of Y is at least 50 mm.

3. The furniture and toy assembly for children according to claim 1, wherein the value of V is between 6-20 mm.

4. The furniture and toy assembly for children according to claim 1, wherein the stabilizing system contains at least one module element attached to the base unit and wherein the assembly is symmetrical to the plane of symmetry of the base unit.

5. The furniture and toy assembly for children according to claim 4, wherein the assembly is configurable in a vertical position by turning the base unit along the plane of symmetry of the base unit, wherein one of the connecting elements of the base unit is a first connecting plate, and a child's seat is formed by the first connecting plate.

6. The furniture and toy assembly for children according to claim 4, wherein the assembly is configurable in a horizontal position by turning the base unit along the plane of symmetry wherein one of the connecting elements of the base unit is a second connecting plate; and a child's seat is formed by the second connecting plate.

7. The furniture and toy assembly for children according to claim 6, wherein the module element is a plate configurable to form one of a table, a drawing board, and a feeding tray.

8. The furniture and toy assembly for children according to claim 4, wherein the module element is a baby tub holder adapter.

9. The furniture and toy assembly for children according to claim 8, wherein the module element is a baby diaper-changing table adapted to be fitted to the baby tub holder adapter.

10. The furniture and toy assembly for children according claim 4, wherein the module element is a slide.

11. The furniture and toy assembly for children according to claim 4, wherein the stabilizing system contains at least two module elements; and wherein the module element is an arched rocker.

12. The furniture and toy assembly for children according to claim 4, wherein the stabilizing system contains at least two module elements; and wherein one module element of the at least two module elements is a sled runner.

13. The furniture and toy assembly for children according to claim 12, wherein one module element of the at least two module elements is a push handle.

14. The furniture and toy assembly for children according to claim 4, wherein the stabilizing system further comprises:
   at least one connecting member for connecting a first structural element to a second structural element;
   wherein the first and second structural elements are connecting elements, side units, and module elements;
   wherein the at least one connecting member comprises:
   an operating unit mountable on the first structural element; and
   a receiving unit mountable on the second structural element;
   wherein the operating unit contains:
      a pin;
      a neck part at one end of the pin;
      an elongated head part formed on the pin;
      wherein the neck part and the elongated head part form a T-shape;
      a collar formed on a side of the neck part of the pin opposite a side of the neck part of the pin facing the head part;
      a handle fixed on an end of the pin opposite an end on which the head part is formed;
   wherein the receiving unit contains:
      a plate defining a plate opening;
      wherein the plate opening is suitable to receive and hold the formed head part; and
      wherein a shape of the plate opening corresponds to a shape of a largest cross-section of the head part.

15. The furniture and toy assembly for children according to claim 14, wherein the operating unit comprises an elastic element arranged on the pin between the collar and the handle.

16. The furniture and toy assembly for children according to claim 15, wherein the operating unit contains a ring arranged on the pin between the collar and the elastic element, wherein the ring is a seeger ring;
   wherein the elastic element is one of a silicone ring, a rubber ring, a rubber foam ring, a corrugated washer, a flexible washer, a spring, and combinations thereof;
   wherein the plate of the receiving unit comprises four protruding elements disposed around the plate opening and protruding from an inner surface of the plate;
   wherein the four protruding elements form a nest for receiving the head part;
   wherein edges of the protruding elements are rounded;
   wherein an edge of an end surface of the head part is curved or rounded;
   wherein the handle is non-removably attached to a first end of the pin opposite a second end on which the head part is formed; and wherein the operating unit further includes a cover plate, and an opening formed on the cover plate.

17. The furniture and toy assembly for children according to claim 14, wherein the operating unit includes an elastic ring arranged on the neck part, and wherein the elastic ring is one of a rubber ring and a silicone ring.

18. The furniture and toy assembly for children according to claim 4, wherein the stabilizing system contains at least four module elements; and wherein one module element of the at least four module elements is a wheel.

19. The furniture and toy assembly for children according to claim 18, wherein the wheel includes a flexible spoke element.

20. The furniture and toy assembly for children according to claim 1, wherein the module element is a tent support frame adapted to be equipped with a tent tarpaulin.

\* \* \* \* \*